July 10, 1923.  1,461,299
C. E. WEHN
METHOD OF SHAPING PYROXYLIN, CELLULOID, AND LIKE MATERIALS
Filed March 4, 1922
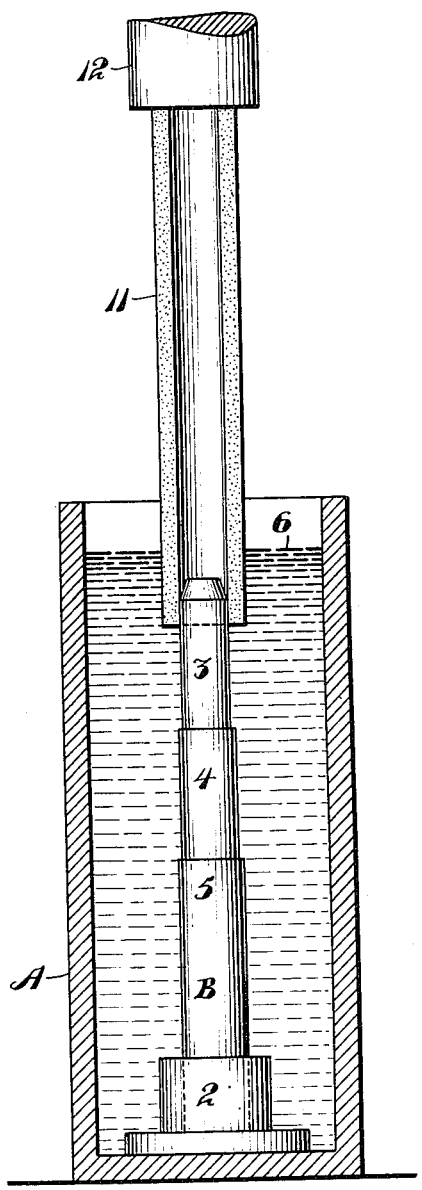
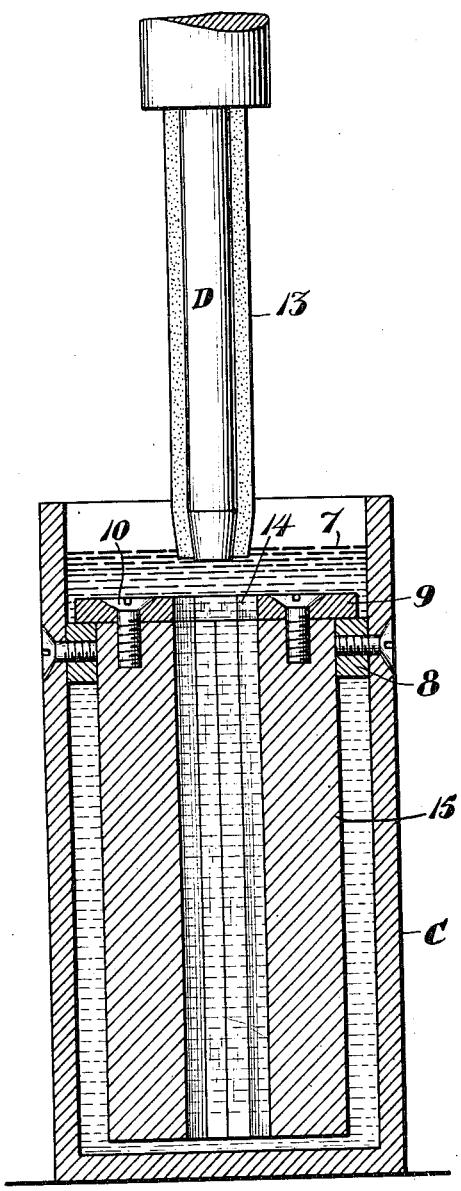
Inventor
Charles E. Wehn
By Drury Strong, Townsend & Loftus
Attorneys Patented July 10, 1923.

1,461,299

UNITED STATES PATENT OFFICE.

CHARLES E. WEHN, OF ALAMEDA, CALIFORNIA, ASSIGNOR TO LISTO PENCIL CORPORATION, OF ALAMEDA, CALIFORNIA, A CORPORATION OF CALIFORNIA.

METHOD OF SHAPING PYROXYLIN, CELLULOID, AND LIKE MATERIALS.

Application filed March 4, 1922. Serial No. 541,069.

*To all whom it may concern:*

Be it known that I, CHARLES E. WEHN, a citizen of the United States, residing at Alameda, county of Alameda, and State of California, have invented new and useful Improvements in Method of Shaping Pyroxylin, Celluloid, and like Materials, of which the following is a specification.

This invention relates to a method of shaping pyroxylin, celluloid and like materials.

In the manufacture of numerous articles, pyroxylin, celluloid and similar materials are being extensively employed, particularly where the article may be cast, molded or pressed to assume the required shape. The use of this material has, however, been limited to articles of manufacture where accuracy does not play an important factor. In instances where accuracy is required, hard vulcanized rubber is employed as hard rubber can be readily machined, molded or otherwise treated to obtain close fits and accurate results. Articles of manufacture which require numerous assembled parts and close fits, such for instance as fountain pens, mechanical pencils, etc., are for this reason constructed of hard rubber. It has been impossible for manufacturers of pyroxylin, celluloid and like tubing, to guarantee within 10 or 20/1000 of an inch the inside or outside dimensions of the tubing. Also, they have found it impossible to hold the inside dimensions concentric with relation to exterior forms or dimensions. It is obvious therefore that some special treatment is necessary to render the outside and inside dimensions of the article manufactured, such as a fountain pen, mechanical pencil and the like, accurate and concentric. This invention depends to a great extent upon the physical properties of pyroxylin and like tubes, especially in the matter of friction fits. I have discovered that unless the physical properties of the pyroxylin are used to advantage, the article manufactured will be inferior. I have further discovered that tubes constructed of pyroxylin and like material, as received from the manufacturer, if expanded or shrunk by heat treatment or other methods, and which are then permitted to cool, will upon being reheated even to a slight extent have a tendency to return to the original shape or size delivered by the manufacturer. I have also discovered a method of taking advantage of the conditions and of shaping or forming pyroxylin, celluloid and like materials whereby any degree of accuracy desired or required can be obtained, thus extending the field of utility of such materials to articles like fountain pens, etc.

The present invention relates particularly to a method of forming or shaping tubular or like members, whether round, square, hexagon or otherwise, and the method consists in passing the member endwise through a heating medium and subjecting the member to the shaping action of a die during its passage through the heating medium. The invention embodies other features which will be more particularly described, having reference to the accompanying drawings, in which—

Fig. 1 is a diagrammatic view illustrating one form of apparatus employed for the purpose of shaping tubes having a circular passage, which is step-like in formation and of varying diameter.

Fig. 2 shows a similar form of apparatus showing one method of changing the exterior shape of tubes and like members.

Referring to the drawings in detail, and particularly to Fig. 1, A indicates a tank, in the bottom portion of which is formed a socket member or holder 2. Adapted to be received thereby is an interior shaping die or mandrel generally indicated at B; said mandrel being circular in cross section and having three offset portions of varying diameter as indicated at 3, 4, and 5. The tank proper is adapted to be filled with water, as indicated at 6, and a water level is maintained so that the die or mandrel B will at all times remain submerged. The water may be heated from the exterior by means of a burner or by means of a steam coil passing through the tank, but not here illustrated. The apparatus shown in Fig. 2 is very similar to the extent that a tank C is employed which is adapted to contain water to the approximate level indicated at 7; this water being heated as previously stated. Formed within the tank is a suitable support 8, and carried thereby is a shaping die plate 9. This die plate is screwed or otherwise secured to a die 15, as indicated at 10, and this plate has a hexagonal shaped opening 14 formed therein, the function of which will hereinafter be described; the support 8 and the die plate 9 being maintained in a submerged condition in the heated water at all times.

As stated in the preamble of the specification, the invention relates particularly to a method of forming or shaping tubular or rod like material; the material employed being pyroxylin, celluloid or the like. This material can be bought in the raw form in the shape of round tubes as indicated at 11, or in the form of solid rods, etc., and the present invention is particularly concerned with the simple method of changing the interior or exterior shape of tubes, rods and the like. In the manufacture of certain types of mechanical pencils, fountain pens, and the like, it is desired to finish both the exterior and the interior surface of certain parts and to accomplish this by a simple method of manufacture; further, to insure rapid production and absolute uniformity of parts to within a fraction of 1/1000 of an inch as such accuracy is often required. The present method of manufacture can accomplish such results and is operated as follows:

Supposing that the raw material is tubular in formation, as indicated at 11, and that it is desired to change the interior diameter of the tube to conform to that of the die or mandrel indicated at B. If this is the case it is only necessary to place the tube 11 on the upper end of the mandrel and then to force it down and over the mandrel by means of a plunger or the like, indicated at 12, which may be manually or automatically operated. It should be remembered that pyroxylin, celluloid, and similar materials, are comparatively hard and non-yielding when maintained under room temperature and that they are not rendered semi-plastic until the temperature is raised to a considerable extent or at least 200° Fahrenheit. For instance by dipping the same in hot water maintained at such temperature, the material almost instantly becomes semi-plastic; therefore when tube 11 is placed on the upper end of the mandrel B, the lower end of the tube will be partly submerged and the lower end thereof will become sufficiently plastic to permit it to expand and assume any shape desired. As the plunger 12 forces the tube 11 downwardly gradual heating of the tube takes place from end to end and that portion of the tube which is being shaped or forced over the mandrel B will gradually assume the shape desired, while the portion extending above the water and the die remains hard until the water level is reached. Practically any pressure required may therefore be exerted on the end of the tube 11 as all that portion which extends above the water level remains hard and non-yielding, while the submerged portion becomes so plastic as to permit expansion and shaping to practically any extent desired. When the entire length of the tube 11 has been pressed over the mandrel B, the tube and mandrel are removed and permitted to cool. A new mandrel is inserted in its place and the next pyroxylin or celluloid tube is applied as described.

The foregoing description discloses a simple method of forming or obtaining inside dimensions in tubes constructed of pyroxylin and like material, and the description further discloses a method whereby the physical properties of the material can be advantageously employed; for instance as the physical tendency of the pyroxylin is to return to its original dimension, it can be readily seen that friction fits may be readily obtained when required.

The pyroxylin hardens rapidly after removal from the water, and the mandrel at the same time cools, thus shrinking away from the pyroxylin to such an extent that easy removal thereof is permitted. If it is desired to change the exterior shape of the pyroxylin tube, it is accomplished by forcing it through a die, such as indicated at 9, see Fig. 2; the tube 13 being permitted to remain on the mandrel as the interior diameter or shape of the tube is to be retained. In Fig. 2 I have illustrated a mandrel D which has been forced into a pyroxylin tube 13. In this case it is desired to retain a true constant interior diameter, and it is also desired to change the exterior shape from that of a circular shape to that of a hexagonal. In this case, as in the first instance, the mandrel D, together with the pyroxylin tube 13 covering the same, is forced downwardly into the hexagonal chamber 14 of the die and as the tube 13 is rendered semi-plastic the moment it becomes immersed in the hot water, it can be seen that the exterior shape can be changed as desired, and that a hexagonal surface will be produced in the present instance. The fact that the exterior shape can be readily altered is more or less due to the semi-plastic condition of the tube or material assumed when heated, but as the physical tendency of the material is to return to its original shape and size, it can readily be seen that if the tube were immediately removed from the shaping die, it would return substantially to its original form and no result would be produced. The natural tendency of the material to return to its original shape is only apparent when the material is fairly warm, but it will retain practically any shape applied thereto when cooled. Therefore it is obvious that it is necessary to remove the exterior shaping die and to cool the same before the pyroxylin tube and the mandrel supporting the same are removed. For this reason it is desirable to make the die in two sections, or to split the same longitudinally as the die can then be readily opened when the material has cooled or when it has reached a temperature where it will retain its shape. As illustrated in Figure 2 the mandrel D is tapered and when it is passed into the die any surplus material will be forced rearwardly along the mandrel.

From the foregoing description it can be seen that the operation of shaping or forming raw material, whether tubular or rod like in formation, is exceedingly simple and rapid, and that practically any exterior or interior formation may be obtained. I further wish to state that a pyroxylin tube, for instance with an interior diameter of 3/8 of an inch, may be expanded to 1/2 of an inch if desired, thus providing a simple method for increasing both the interior and exterior diameter of a given size stock, if this should prove desirable. Shrinkage of the pyroxylin when it cools is, practically speaking, a constant factor and the size of the shaping die is therefore increased or decreased in diameter to obtain the desired result; thus any diameter or size may be obtained when the finished product is considered which will not vary more than a slight fraction of 1/1000 of an inch. This is obviously an important result as it permits the manufacture of parts where close fits are required, thus extending the field of use of this material to many arts were hard vulcanized rubber has heretofore been solely depended upon.

In the present instance I have referred to heating the material to be treated and the dies employed by means of hot water. This method is very convenient and simple in actual use, but it should be obvious that I do not wish to be limited thereto as it is possible to heat the dies alone without heating the material either by steam jacketing the dies or otherwise heating the same, or it is possible to heat the material itself without heating the dies.

Having thus described my invention, what I claim and desire to secure by Letters Patent is—

1. A method of changing the interior diameter of pyroxylin tubes, which consists in submerging a mandrel shaped die in a body of hot water and then forcing the pyroxylin tube over said mandrel while the mandrel is maintained in a submerged condition in the heated water to progressively heat and soften the tube and simultaneously change the shape of the same.

2. A method of changing the interior diameter of tubes constructed of pyroxlin and like materials, which consists in forcing the pyroxylin tube over a mandrel shaped die while the die is in a heated condition to progressively soften and simultaneously change the shape of the tube and allow the tube to cool on the mandrel.

3. A method of changing the exterior shape of tubes constructed of pyroxylin and like material where it is desired to also maintain a predetermined shaped interior finish, which consists in forcing the pyroxylin tube over a heated mandrel shaped die to progressively heat and soften the tube and simultaneously change the shape of the interior thereof, said mandrel like die having a reduced portion at its forward end to engage the pyroxylin tube at the forward end so that a pull may be exerted on the pyroxylin tube by means of a mandrel, then passing said pyroxylin covered mandrel endwise into a heated forming die to progressively heat and soften the tube and simultaneously change the shape of the exterior of the same, which die will engage the exterior surface of the pyroxylin tube and force rearward on said mandrel any surplus pyroxylin, and retaining the mandrel and the tube covering the same in the shaping die while the shaping die is cooled.

4. A method of changing the exterior shape of tubes constructed of pyroxylin and like material, where it is desired to also maintain a predetermined shaped interior finish, which consists in forcing the pyroxylin tube over a heated mandrel to progressively heat and soften the tube and simultaneously change the shape of the interior thereof, said mandrel being provided with means at its forward end for engaging the pyroxylin tube and securing the same so that a pull may be exerted on the pyroxylin tube by means of the mandrel, then passing said pyroxylin covered mandrel endwise into a heated forming die which will engage the exterior surface of the pyroxylin tube and force rearward on said mandrel any surplus pyroxylin, and retaining the mandrel and the pyroxylin tube covering the same in the forming die while the forming die is cooled.

5. A method of changing the exterior shape of tubes constructed of pyroxylin and like material, where it is desired to also maintain a predetermined shaped interior finish, which consists in forcing the pyroxylin tube over a heated mandrel to progressively heat and soften the tube and simultaneously change the shape of the interior thereof, then passing said pyroxylin covered mandrel endwise into a heated forming die which will engage the exterior surface of the pyroxylin tube and force rearward on said mandrel any surplus pyroxylin, and retaining the mandrel and the pyroxylin tube covering the same in the forming die while the forming die is cooled.

CHARLES E. WEHN.